US009883394B2

(12) United States Patent
Kasravi et al.

(10) Patent No.: US 9,883,394 B2
(45) Date of Patent: Jan. 30, 2018

(54) VIRTUAL MOBILE PHONE INTERFACE SYSTEM AND METHOD THEREOF

(71) Applicant: ENT. SERVICES DEVELOPMENT CORPORATION LP, Fort Collins, CO (US)

(72) Inventors: Kas Kasravi, Pontiac, MI (US); Famauz R. Patel, Pontiac, MI (US); Sachin H. Patel, Pontiac, MI (US)

(73) Assignee: Ent. Services Development Corporation LP, Houston, TX (US)

( * ) Notice: Subject to any disclaimer, the term of this patent is extended or adjusted under 35 U.S.C. 154(b) by 104 days.

(21) Appl. No.: 14/893,924

(22) PCT Filed: May 30, 2013

(86) PCT No.: PCT/US2013/043457
§ 371 (c)(1),
(2) Date: Nov. 24, 2015

(87) PCT Pub. No.: WO2014/193395
PCT Pub. Date: Dec. 4, 2014

(65) Prior Publication Data
US 2016/0112875 A1  Apr. 21, 2016

(51) Int. Cl.
*H04M 1/66* (2006.01)
*H04M 1/68* (2006.01)
(Continued)

(52) U.S. Cl.
CPC .......... *H04W 12/06* (2013.01); *G06F 3/0484* (2013.01); *H04L 63/105* (2013.01); *H04L 63/08* (2013.01);
(Continued)

(58) Field of Classification Search
CPC ..... H04W 12/06; H04W 88/02; G06F 3/0484; H04L 63/105; H04L 63/08; H04L 67/02; H04L 67/08
(Continued)

(56) References Cited

U.S. PATENT DOCUMENTS 8,060,074 B2   11/2011  Danford et al.
8,219,063 B2 *  7/2012  Rogel ................. G06F 9/45537
                                              455/405

(Continued)

FOREIGN PATENT DOCUMENTS

JP   2012531679 A    12/2012
KR   20060031976     4/2006
WO   WO-2009052424 A2  4/2009

OTHER PUBLICATIONS

Android Developers; "Using the Android Emulator"; http://developer.android.com/tools/devices/emulator.html: 23 pages.
(Continued)

*Primary Examiner* — William Nealon
(74) *Attorney, Agent, or Firm* — Sheppard Mullin Richter & Hampton LLP

(57) ABSTRACT

Examples of the present invention disclose a virtual mobile phone interface system and method thereof. According to one example, a virtual phone host server collects user phone data and phone interface information from a virtual mobile phone application running on a mobile phone device. Furthermore, a mobile phone emulator is activated on a web browser interface associated with the client device based on the phone interface information and a phone access request received from a user operating a client device.

11 Claims, 7 Drawing Sheets

(51) Int. Cl.
  *H04W 12/06* (2009.01)
  *G06F 3/0484* (2013.01)
  *H04W 88/02* (2009.01)
  *H04L 29/08* (2006.01)
  *H04L 29/06* (2006.01)
(52) U.S. Cl.
  CPC .............. *H04L 67/02* (2013.01); *H04L 67/08* (2013.01); *H04W 88/02* (2013.01)
(58) Field of Classification Search
  USPC ......................................................... 455/411
  See application file for complete search history.

(56) References Cited

U.S. PATENT DOCUMENTS

| | | | | |
|---|---|---|---|---|
| 8,340,633 | B1* | 12/2012 | Rege | H04W 4/26 455/405 |
| 2003/0145044 | A1* | 7/2003 | Raivisto | H04L 29/06 709/203 |
| 2003/0195010 | A1* | 10/2003 | Pattabiraman | H04W 88/02 455/517 |
| 2009/0036111 | A1* | 2/2009 | Danford | H04L 41/0893 455/419 |
| 2010/0235830 | A1* | 9/2010 | Shukla | G06F 9/44526 718/1 |
| 2010/0311391 | A1* | 12/2010 | Siu | H04W 8/205 455/411 |
| 2011/0075825 | A1* | 3/2011 | Balasaygun | G06F 9/45533 379/93.17 |
| 2012/0166653 | A1 | 6/2012 | Twitchell | |
| 2012/0233663 | A1* | 9/2012 | Ortiz | H04L 63/0272 726/4 |

OTHER PUBLICATIONS

Andrus, J. et al.; "Cells: a Virtual Mobile Smartphone Architecture"; Oct. 23-26, 2011; pp. 173-187.
Briones, G.R.; "Vox.io lets you make calls from your web browser for free"; Jul. 9, 2012; 3 pages.
PCT; "Notification of Transmittal of the International Search Report and the Written Opinion of the International Searching Authority, or the Declaration"; cited in PCT/US2013/043457; dated Feb. 27, 2014; 14 pages.
Wikipedia, "Remote Desktop Services," Feb. 26, 2013, <https://en.wikipedia.org/w/index.php?title=Remote_Desktop_Services&oldid=540690784>.

* cited by examiner

VIRTUAL MOBILE PHONE INTERFACE SYSTEM AND METHOD THEREOF

BACKGROUND

Mobile phone communication—facilitated through use of cell phones and smartphone devices—has become ubiquitous in today's society. Many users have become reliant on their mobile communication device as the primary source for management of user data including contacts, calendar, tasks, media, and text messages. Consequently, the mobile phone is often considered the hub of personal information for countless users. Misplacing or losing one's mobile phone is often a traumatic experience due to the inability to place phone calls, in addition to the inaccessibility and possible loss of personal information stored on the mobile device. In some cases, the mobile phone may be intentionally left behind or forgotten, leading to the same unpleasant outcomes.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

Figure 1:
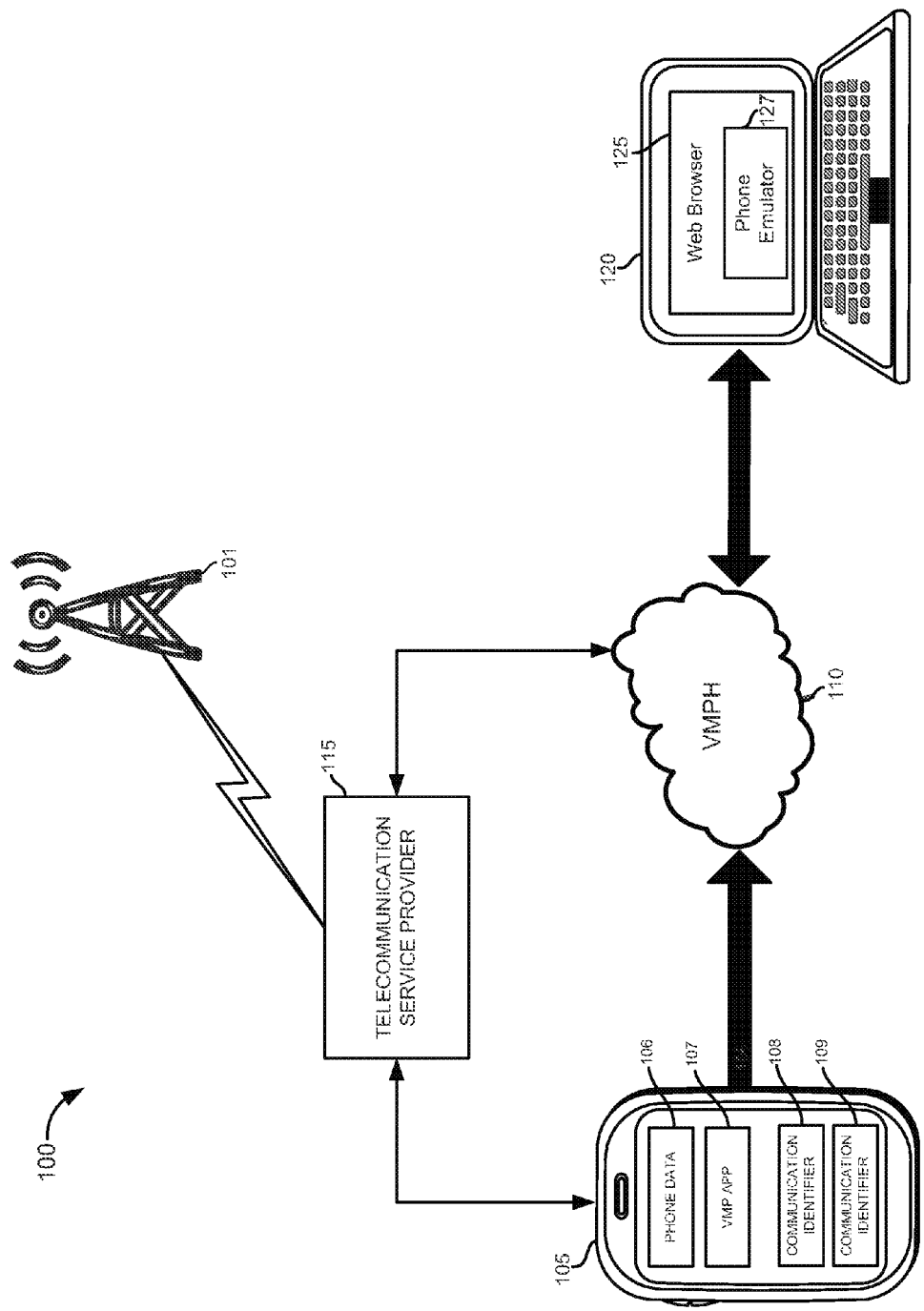
FIG. 1 is a generalized schematic and conceptual diagram of a virtual mobile phone interface system according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Because mobile phones are integral to the storage and management for personal information, user's often face unfortunate challenges in the event of a lost or misplaced phone. There have been several attempted solutions to the aforementioned problem. Some prior solutions provide internet-based communications services. However, these systems simply provide an alternative to an existing mobile phone rather than an exact or virtual copy of the mobile device and associated functionality. That is, existing internet-based solutions are aimed at parallel use with a user's mobile device and do not provide the necessary functionality and/or stored information in the event of a user misplacing the device. Other solutions provide a service for remotely controlling a personal mobile device. A remote control service, however, still fails to provide the two-way communication afforded by mobile phone devices.

Some solutions enable a user to manually create duplicate portions of their phone content in one or more locations, which may not be practical. Though contact, calendar, and tasks items may be stored on third-party web-based applications, other personal information such as text messages, phone records, applications and phone settings are not easily stored based on known technologies. Moreover, duplicating the content and functionality of a mobile phone, in a manner that can be readily accessed by a user is not easy, obvious, or possible with current solutions. As such, there is a need in the art for a system and method that provides true replication of virtual mobile phone functionality without physical access to the mobile phone.

Examples of the present invention provide a system and method that replicates the functionality of a missing mobile phone via a browser and phone emulator on any internet-connected computer. According to one example, the system includes an application installed on the mobile phone that securely uploads all of the mobile phone data, apps, and settings to a virtual mobile phone host (e.g., cloud-based server). Furthermore, a browser interface associated with a surrogate computing device includes a mobile phone emulator and serves as an auxiliary access vehicle to the mobile phone's features, data, applications, and the like including the ability to make or receive a phone call via the computing device and phone emulator. Additionally, an authentication and control module provides a means for securing access to the virtual phone data while also enabling user control between the physical phone and virtual phone based on credentials and an access request received from the user.

Referring now in more detail to the drawings in which like numerals identify corresponding parts throughout the views, FIG. 1 is a generalized schematic and conceptual diagram of a virtual mobile phone interface system according to an example of the present invention. As shown here, examples of the present invention include a wireless communication tower 101, a mobile phone device 105, a virtual mobile phone host server 110, a telecommunication service provider 115, and a surrogate computing device 120. As will be explained in further detail below with reference to FIG. 2, the virtual mobile phone (VMP) host server 110 includes software components, a cloud infrastructure, and service to support telecommunication capabilities for registered clients/users and/or devices. According to one example, mobile phone 105 represents a cellular phone, mobile telecommunication device, or similar device capable of wireless communication (e.g., tablet) having personalized phone data 106 such as a contacts, calendar, tasks, text messaging, etc., a virtual mobile application 107, a unique communication identifier 108, and a phone interface identifier 109 representing an operating system of the mobile device. Service provider 115 is a telecommunication company or entity that provides for communication services and assigns a unique communication identifier (e.g., phone number) to a mobile phone device. The surrogate computing device 120 represents a network-enabled computing device including a desktop computer, laptop computing device, tablet computing device, or smartphone for example. The surrogate computing device 120 includes a web browser 125 for retrieving and presenting information and resources from the internet and more particularly, from VMP host server 110. Still further, the browser 120 includes a phone emulator 127, which provides a more realistic experience to the user. According to one example, the phone emulator 127 is configured to substantially duplicate and closely resemble the look, feel, and behavior of a mobile phone.

Figure 2:
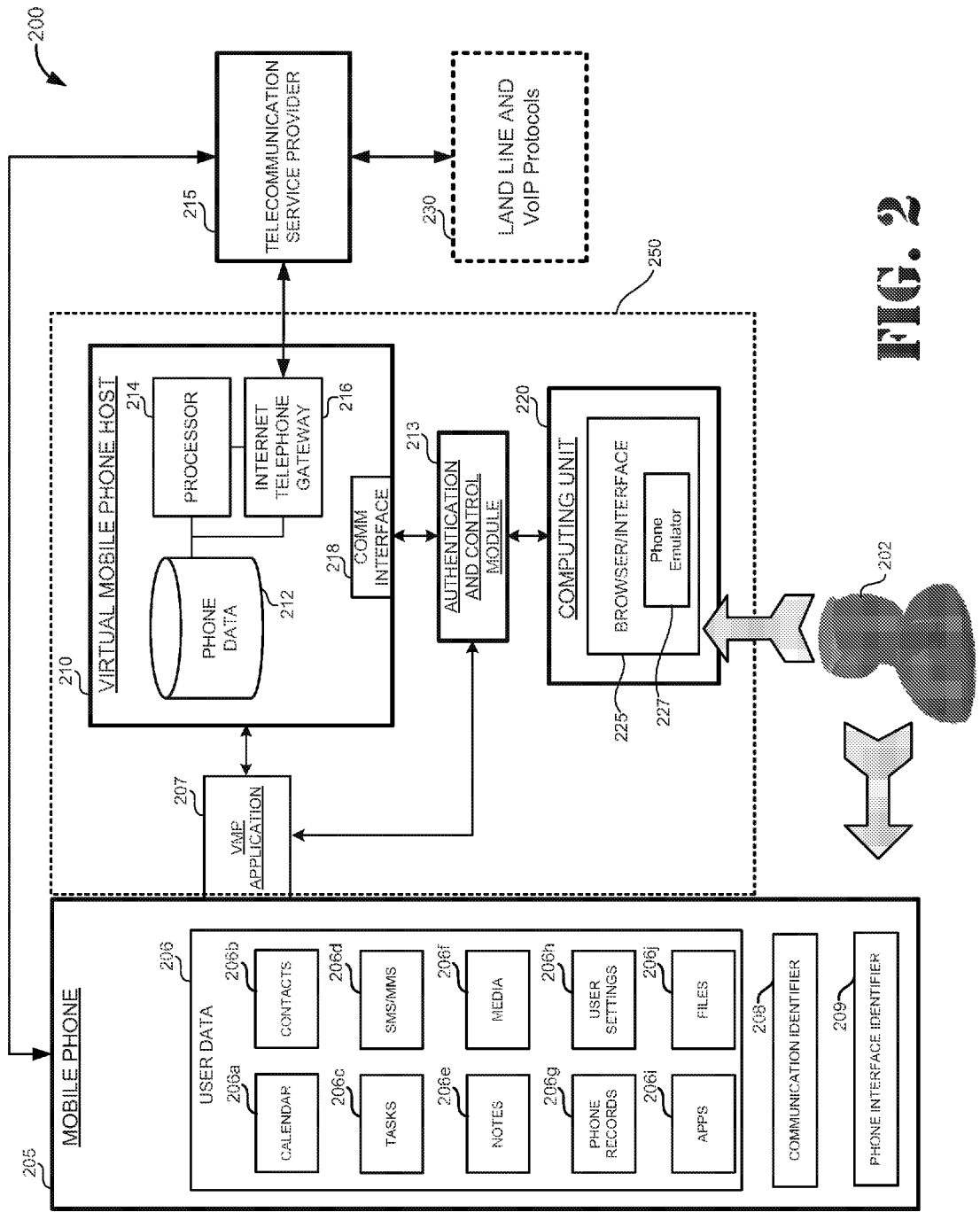
FIG. 2 is a simplified block diagram of a virtual mobile phone interface system according to an example of the present invention.

FIG. 2 is a simplified block diagram of a virtual mobile phone interface system according to an example of the present invention. As shown, the virtual mobile phone replication system 200 includes a mobile phone device 205, a virtual mobile phone host 210, a telecommunication service provider 215, a surrogate computing unit 220, and landline and IP networking protocols 230. The mobile phone device 205 includes user data 206, virtual mobile phone application 207, communication identifier 208, and a phone interface identifier 209. The personal phone data 206 of the mobile phone is associated with an operating user 202 and includes, but is not limited to: contacts, calendar data 206a, contacts 206b, task items 206c, short messaging service (SMS)/multimedia message service (MMS) messages 206d, notes 206e, media (pictures/video/music) 206f, phone records/call history 206g, user phone settings 206h, applications 206i, and files 206j. According to one example embodiment, the virtual mobile phone application 207 represents a software application configured to read personal data 206 of the mobile phone (e.g., contact, call history, etc.) and securely transfer the data 206 to the VMP host 210. The communication identifier 208 represents a unique number associated with the mobile phone device such as a mobile phone number issued by the telecommunication service provider 215 for example. By way of example, the phone interface identifier 209 represents an identification number or information associated with the current operating system or interface running on the mobile phone 205.

The virtual mobile phone interface system 250 includes the VMP app 207, the VMP host 210, authentication and control module 213, and a client device 220. According to one example, the VMP host 210 represents a cloud-based infrastructure and service comprising of a database 212 for storing the mobile phone data, a processing unit 214, an internet telephony gateway 216, and a communication interface 218. Processor 214 represents a central processing unit (CPU), microcontroller, microprocessor, or logic configured to execute programming instructions associated with the VMP host 210. The communicator interface 218 represents a HTML/XML or similar interface for facilitating network access from the surrogate computing device 220. The internet telephony gateway 216 allows for bi-directionally communication between the VMP host 210 and service provider 215, which represents a telecommunication service company configured to provide wireless telecommunication services to clients/mobile devices. Service provider 215 may be associated with broadband and telecommunication companies that provide landline and/or VoIP communication/networking services. Examples of the present invention thus enable the VMP host 210 and surrogate computing device 220 to place and receive phone calls using landline/VoIP protocols 230.

The surrogate computing device 220 is operated by a registered user 202 and represents a networked computer having a browser or web-based interface 225. Additionally, the computing device 220 is configured to communicate bi-directional with the VMP host 210 via the browser interface 225 and communication interface 218 of the VMP host 210. Furthermore, the web-based interface 225, which runs on the surrogate computing device 220, is capable of utilizing the phone data stored on the VMP host database 212 to simulate the mobile phone 205 by providing for: access to contacts, calendar items and other data associated with the mobile device 205, emulation of applications, playback of music and video, and display of pictures associated with mobile device 205 for example. In addition, the imported communication identifier 208 of the mobile device 205 may be utilized for remote telecommunication including the ability to make and receive phone calls using the same communication identifier associated with the mobile phone 205. Thus, a registered user 202, who normally operates the mobile phone device 205, can now replicate all or substantially all functionality, including data and media access, provided by the mobile phone through the browser and web-based interface 225. And in the case of a misplaced or lost mobile phone 205 for example, telecommunication services—using the mobile phone communication identifier 208—may still be accomplished via the VMP host 210 and surrogate computing device 220.

Generally, when the mobile phone 205 is available and operated by a user, the mobile phone 205 communicates directly with the telecommunication service provider 215 in a normal or first operating mode. In accordance with one example, communication between the mobile phone device 205 and the VMP host 210 becomes active when the mobile phone device 205 is not available to the user. In such a scenario, the user may utilize the browser 225 of the surrogate computing unit 220 to signal for the VMP host 210 to activate communication services on the surrogate computing unit 220 and to also make the latest version of the phone's user content available to SP 215 and browser 225. The primary communication identifier (i.e., mobile phone number) may be switched from the mobile phone 205 to VMP host 210 and/or the temporary surrogate device 220 via call forwarding such that costs associated with service fees can be directed back to the user's account with the SP 215. Moreover, the telecommunication service provider 215 may bill users of the VMP host 210 based on various billing models such as usage-based or flat fee (service insurance option) models for example.

In accordance with one example embodiment, a registered user may misplace mobile phone 205 (i.e., device unavailable) and desire to switch from the normal operating mode to a secondary operating mode using browser 225 of the surrogate computing device 220. When the VMP host 210 receives a change request from the user (e.g., via browser 225) to switch to the secondary operating mode, the VMP host 210 may communicate the change to the telephone service provider 215 in order to assign a secondary communication identifier (i.e., temporary phone number) to the registered user 202. Thereafter, future telephonic calls to primary communication identifier are automatically forwarded to the secondary communication identifier and retrieved by the user via browser 225. That is, the user may make and receive phone calls and SMS/MMS messages (i.e., telecommunication functionality), via VoIP 230 and browser 225, using the secondary communication identifier (although transparent to the user). The user 202 may also access all of the personal user data via the browser 225 including calendar items 206a and media 206f for example that was previously synched with the phone data database 212 (i.e., data access functionality).

Moreover, browser 225 includes a virtual mobile phone emulator 227. In one example, the phone emulator 227 is configured to provide a more realistic experience to the user by providing an image and interface that closely resembles a mobile phone device as will be shown in further detail with referenced to FIGS. 3A-3F. Still further, the phone emulator 227 may utilize an image that represents the specific type of user interface associated with the physical phone (mobile phone 205) owned by the user. In one example, inclusion of emulator 227 may also serve to provide better support for mobile applications, text, media and the like that are configured to operate/display properly on the mobile phone but may not be supported on a standalone web browser interface.

Upon accessing the virtual phone 250, the authentication and control module 213 is configured to verify the identity of the user and provides options for either accessing the phone data 212 through the browser interface 225 only, or accessing the phone data 212 by taking full control over the actual mobile phone device 205. If the latter option is exercised, the entre phone functionality and control are transferred to the virtual mobile phone host 210, and the mobile phone device 207 is locked and rendered inoperable, in which case the virtual phone 250 operates via the cloud-based service and VMP host server 210. Providing both telecommunication and data access functionality through the VMP host 210 and browser 225/emulator 227 thus enables virtual replication of the mobile device 205 on the surrogate computing device 215.

In the event that the mobile phone 205 is recovered or replaced, the user 202 may communicate with the VMP host 210 via browser 225 to reactivate and switch telecommunication services back to the normal operating mode (i.e., mobile phone 205 communicates directly with service provider 215). More particularly, once the user is authenticated and a reactivation request is received, the virtual mobile phone services to the client device 220 are terminated and the physical phone 205 recovers complete control of telecommunication services. Moreover, newly created data and content by the user 202 on the virtual phone 250, and stored in the phone data 212 within the cloud-based VMP host 210, can be automatically transferred back to the mobile phone device 205 via the virtual mobile phone application 207. Accordingly, any new data generated while using the VMP host 210 and computing device 220 as a virtual phone (e.g., text messages, images, or call history) can be quickly and easily retained and synchronized when the physical phone is recovered or replaced.

Figure 3A:
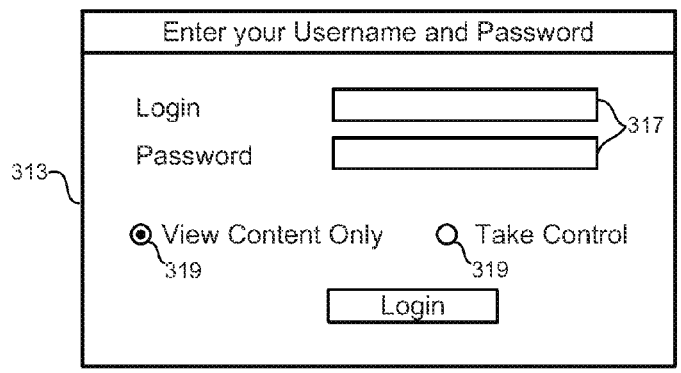
FIGS. 3A-3F are sample screenshots of the browser interface and phone emulator according to an example of the present invention.
Figure 3B:
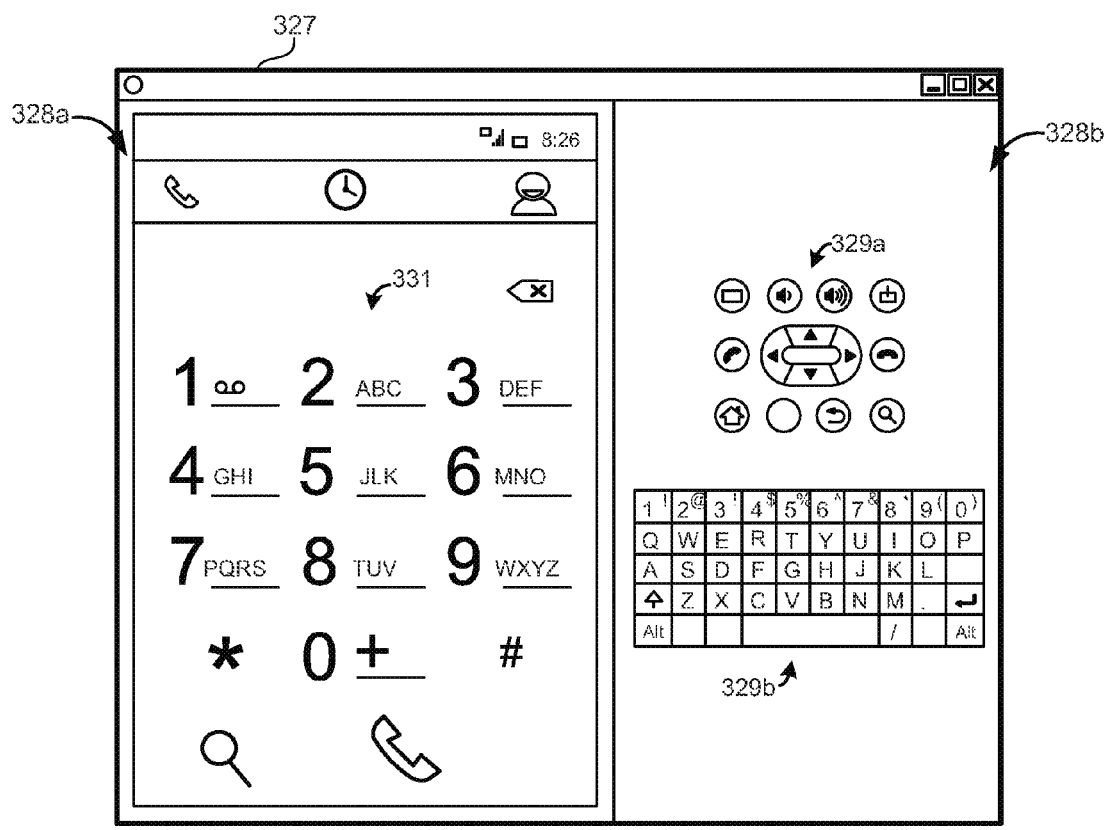
Figure 3C:
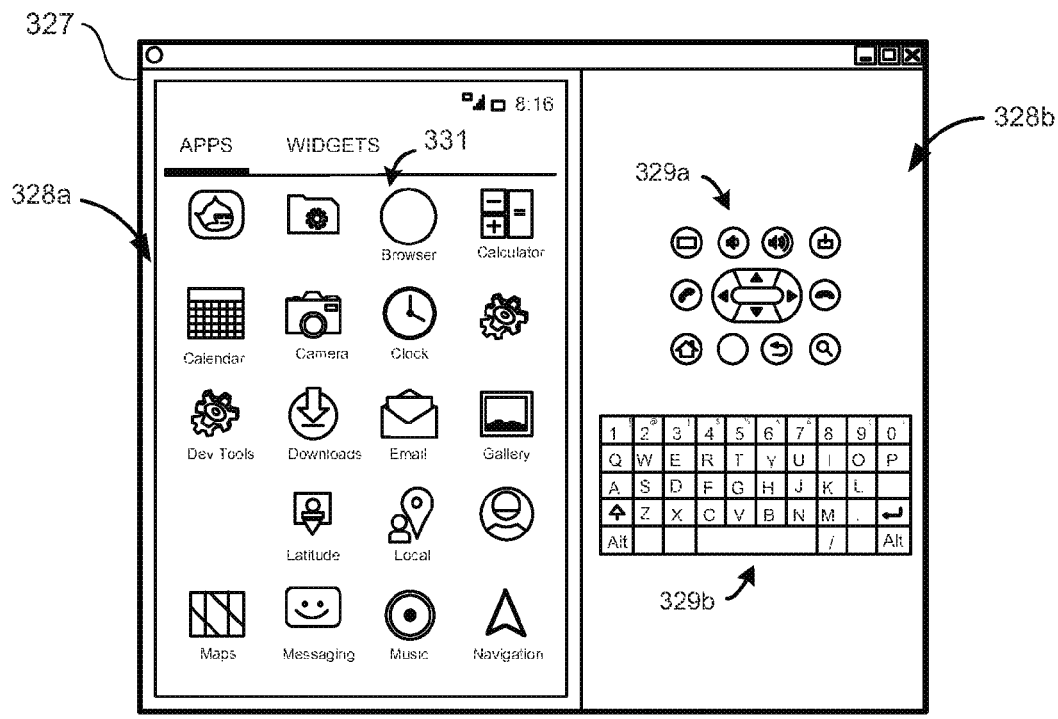

FIGS. 3A-3F are sample screenshots of the browser interface and phone emulator according to an example of the present invention. FIG. 3A is a sample screen shot of the authentication and control verification interface 313 for verifying the credentials of an operating user desired to access a mobile phone from a client or surrogate device. The authentication and control interface 313 includes identify verification fields 317 and phone access control options 319. The identify verification fields 317 may include a username and password information, fingerprint sensor, facial recognition software or similar means for verifying the identity of the operating user. The phone access control options 319 are utilized by the authentication and control module to determine the level of phone and data access to grant the operating user. According to one example, and as described above, the operating user may be granted either phone data access only through the web browser of the client device, or full access control of phone data and service functionality through transfer of the communication identifier to the VMP host and activation of the mobile phone emulator on the browser interface and client device as described above.

Referring now to FIG. 3B-3F, FIG. 3B depicts a sample screenshot of the mobile phone emulator 327. As shown here, the phone emulator 327 may include simultaneous view of both a main window 328a and an auxiliary input window 328b. By way of example, the main window is configured to emulate a primary display area of the mobile device while the auxiliary input window 328b is positioned immediately adjacent to the main window 328a and is configured to emulate additional input functionality for the main window. In the present example, the main window 328a includes a standard numeric keypad as found on a traditional mobile phone. In this way, the mobile phone emulator 327 is configured to replicate the exact look and feel of an actual mobile phone. The auxiliary input window 328b may include shortcut icons 329a in addition to a keyboard graphical input interface 329b. According to one example, a user may facilitate selection on the client device within either the main window 328a or auxiliary window 328b through mouse or keyboard input (e.g., desktop as client/surrogate device), or via touch-based or gesture input (e.g., tablet as client/surrogate device). More particularly, phone interface information relating to the operating system of the mobile phone may be collected by the VMP application running on the mobile phone. The VMP host server may then match the phone interface information with an associated virtual phone emulator. For example, given the phone interface information, the VMP host server may activate an emulator resembling an iOS (Apple®) mobile operating system) or Android (Google® mobile operating system) operating interface. FIG. 3O depicts an application launcher as the main window 328a. Accordingly, an operating user on the client device may select any application icon thereon so as to launch a corresponding application as if operating the actual mobile device. Furthermore, the virtual mobile phone may replicate the skin of the physical mobile phone, in addition to the exact location of application icons so as to provide an accurate look and feel of the physical mobile phone.

Figure 3D:
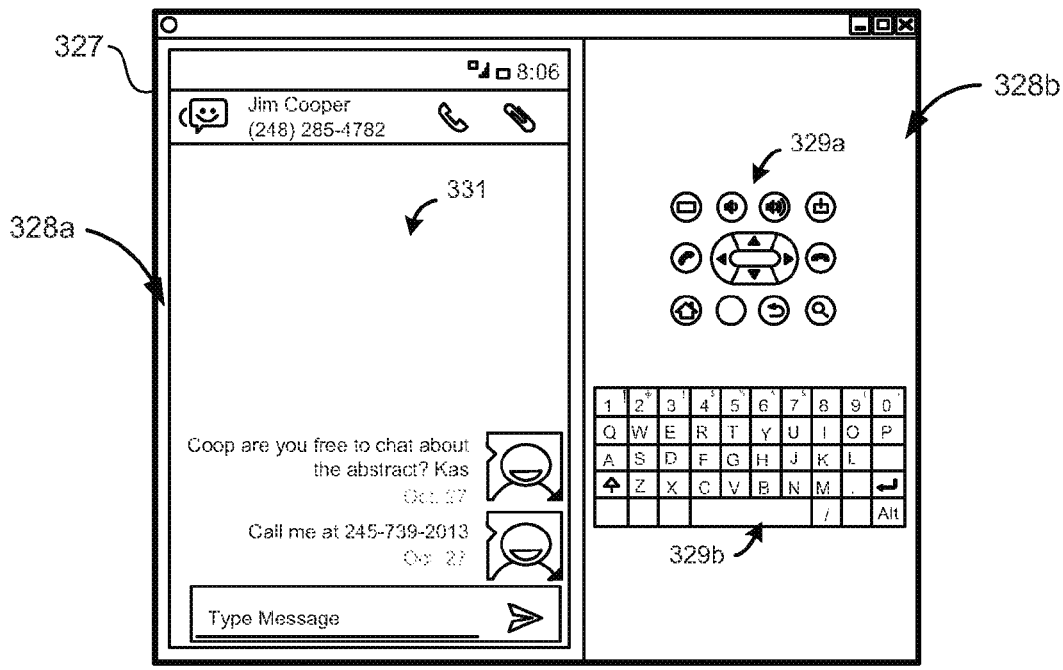
Figure 3E:
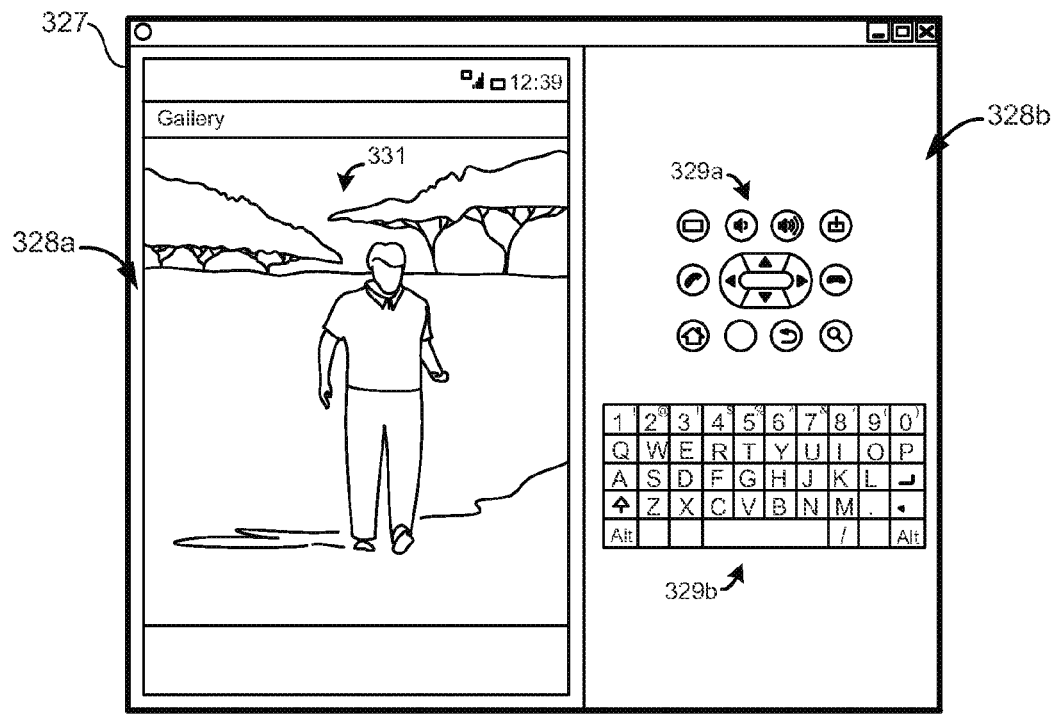
Figure 3F:
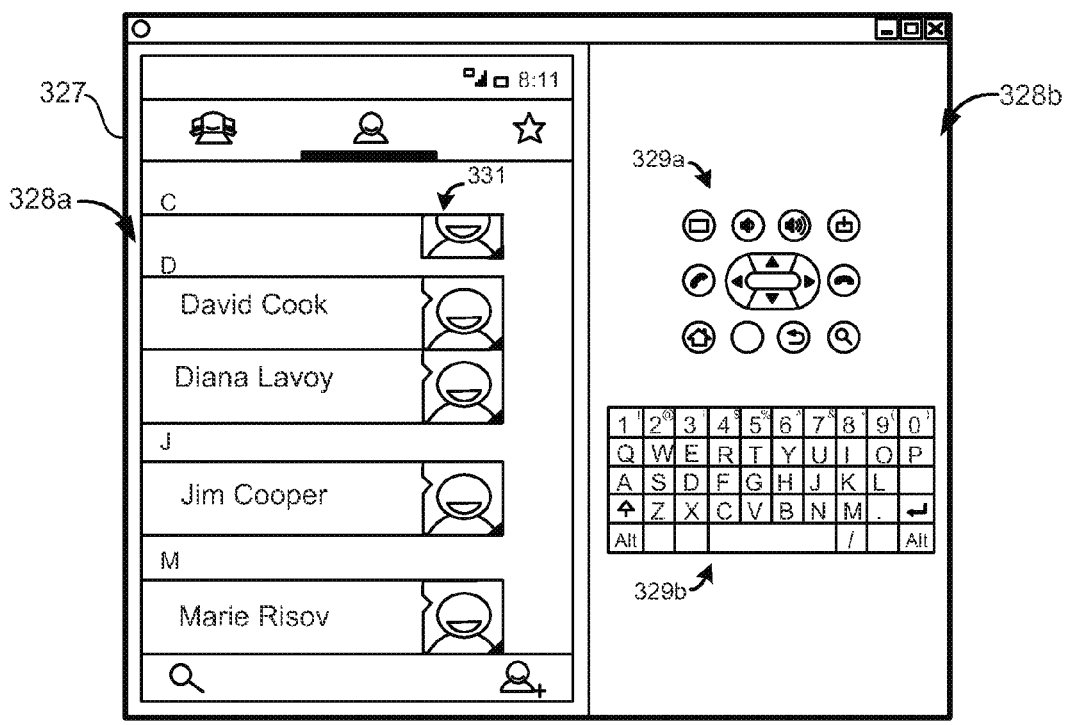

FIG. 3D depicts a messaging window as the main window 328a. Here, the operating user may input text-based messages and messaging such as those associated with short messaging service, multimedia messaging service or instant messaging using the keyboard interface 329b or standard keyboard associated with the client device for example. FIGS. 3E and 3F depict, within the main window 328b of the mobile phone emulator 327, an image from an image gallery and a contact list respectively, as would be shown on the actual mobile device. In accordance therewith, the virtual mobile phone interface system and mobile phone emulator of the present examples are capable of effectively replicating and emulating the user experience of the mobile device on a secondary or surrogate access device.

Figure 4:
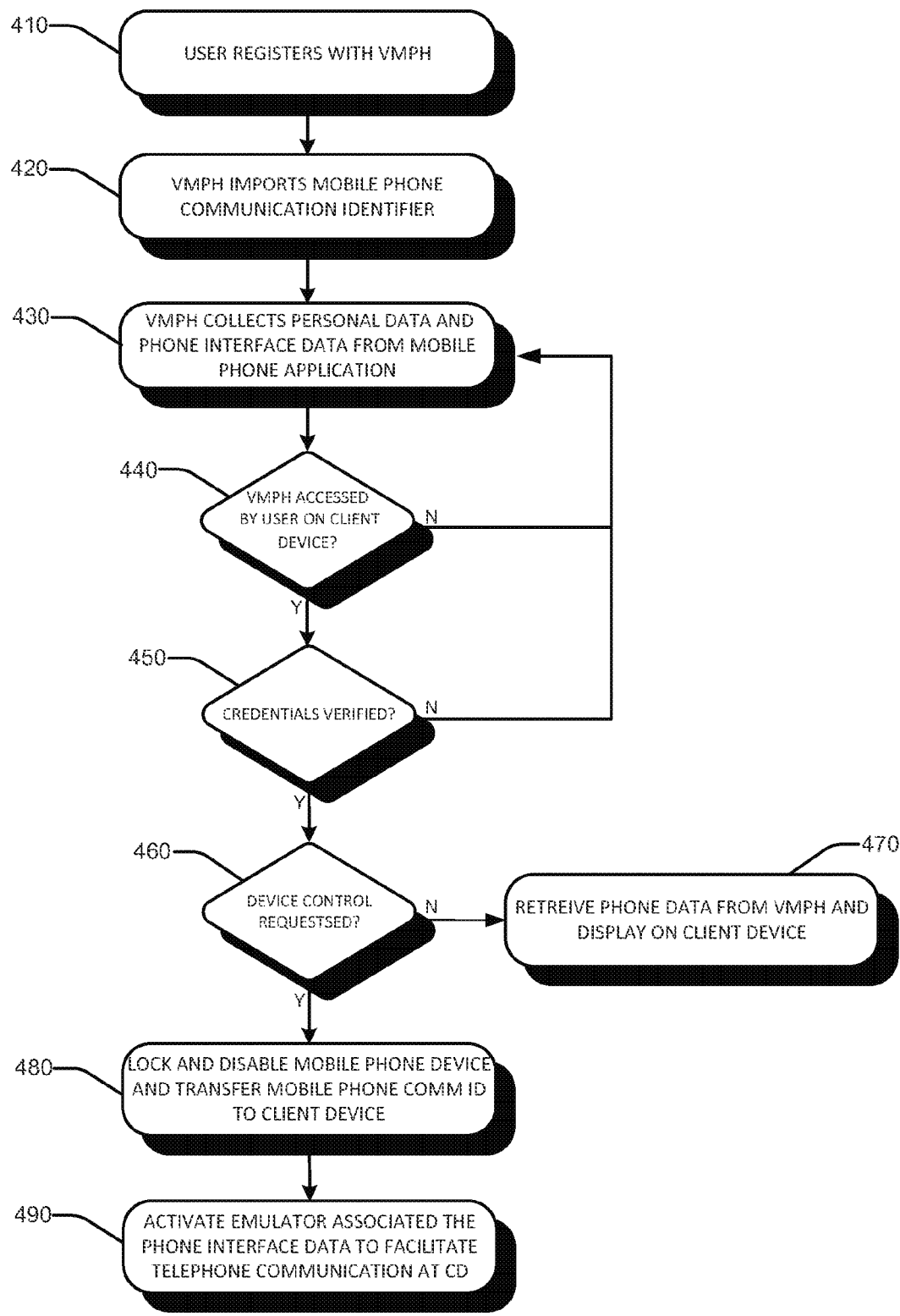
FIG. 4 is a simplified flow chart of the processing steps for providing the virtual mobile phone interface on a client device according to an example of the present invention.

FIG. 4 is a simplified flow chart of the processing steps for providing the virtual mobile phone interface on a client device according to an example of the present invention. In step 410, a user operating the mobile device registers with the virtual mobile phone host so as to create registration credentials. Next, in step 420, the VMP host imports the communication identifier or phone number of the mobile device and also collects user phone data and phone interface information from the mobile phone in step 430. As described above, a virtual mobile phone application running on the mobile device is used to facilitate the transfer of the user data from the mobile phone to the VMP host. The data transfer process may occur continuously and in real-time such that the VMP host server includes the most current user phone data. According to one example embodiment, after the initial upload of all the user data, the processing unit of the VMP host may communicate with the VMP application of the mobile device periodically to detect changes made to user data such that updates to the phone data are only made based on detected changes, thereby reducing bandwidth consumption and data transfer costs. Upon determining, in step 440, that the registered user has accessed the VMP host on a surrogate computing device, and the operating user has been properly authenticated (via input of registration credentials) by the authentication and control module in step 450, a determination is made as to level of access requested by the user in step 460. If device control is not requested, then the VMP host retrieves the phone data and displays the requested data on the browser interface of the client device. On the other hand, if the user opts for full device control in step 460, then the mobile phone device is locked and disabled, and the mobile phone communication identifier is transferred to the client device so that mobile phone communication and phone data (i.e., personal data and phone interface information) are retrieved and replicated at the surrogate computing device in step 480. Moreover, in the event the mobile phone is determined as stolen, in addition to the device being disabled, the information and person data stored thereon may be remotely wiped upon the user assuming full device control. Next, in step 490, an emulator associated with the phone interface information is activated on the browser interface so as to facilitate a more realistic telephonic communication experience on the client device.

Figure 5:
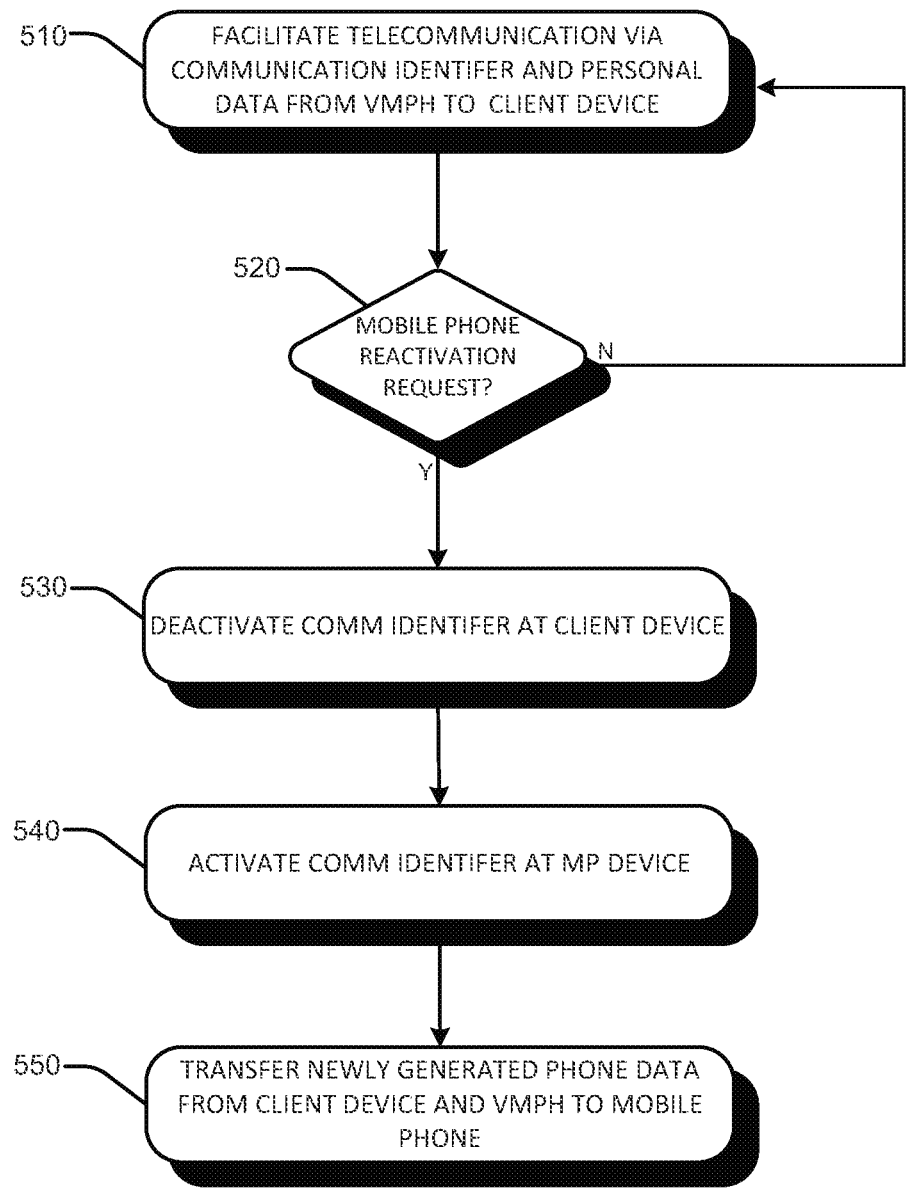
FIG. 5 is a simplified flow chart of the processing steps for deactivating the virtual mobile phone interface on the client device according to an example of the present invention.

FIG. 5 is a simplified flow chart of the processing steps for deactivating the virtual mobile phone interface on the client according to an example of the present invention. By way of example, in the event that the mobile phone is recovered or replaced, the virtual mobile phone system is configured to allow for control to be passed back to the physical phone. In step 510, telecommunication is facilitated from the VMP host to the client device based on the communication identifier. Upon receiving a reactivation signal from the mobile phone or a reactivation request from the client device in step 520, virtual phone services are turned off at the client device through deactivation of the communication identifier at the client device by the VMP host in step 530. Thereafter, the mobile phone device resumes normal operation through restoration and activation of the communication identifier on the mobile device in step 540. Still further, newly generated phone data on the virtual phone (via client device) is automatically transferred to the mobile phone device 205 using the VMP host and application in step 550. Accordingly, the virtual mobile phone system is capable of providing a means to pass control back and forth between the actual mobile phone and VMP host per the operating user's request.

By way of example, when transferring the content of the VMP back into the physical phone, the virtual mobile phone is configured to handle multiple different scenarios, and in each scenario a slightly different recovery and reactivation action may be performed by the virtual mobile phone. For instance, in the event the same mobile phone is recovered, only the changes while on the virtual phone interface and client device are downloaded from the virtual mobile phone onto the physical device. In another example, in the event a new but identical phone is obtained, all the content and settings from the virtual mobile phone may be loaded onto the new device. In yet another example, in the event a different phone is obtained with the same operating system, all the content is loaded from the virtual mobile phone onto the new device, but the settings and locations of the application icons and similar content may be different depending on the characteristics of the new physical phone. Lastly, in the event a different phone is obtained with a different operating system, a best attempt may be made to load the content and settings (via converters) to the new phone, but some loss of data or features may occur if the new operating system does not support the features, licenses, or settings of the original operating system.

Embodiments of the present invention provide a virtual mobile phone interface system and method thereof. Moreover, many advantages are afforded by virtual mobile phone interface system in accordance with examples described here. For instance, registered users of the VMP host are no longer concerned about misplacing or losing their mobile phone as they can readily access content and functionality of their mobile phone via any internet-connected browser. Moreover, the virtual mobile phone may also be used—in the case of the phone not being lost or stolen—as a means of demonstrating the functionality of a new phone or application. Additionally, examples of the present invention enable for convenient and efficient transfer and access to media and software applications of the mobile device using the VMP host server. Furthermore, access control over both the virtual and physical phone is centralized, seamless and user-friendly. Meanwhile, data reliability is maintained as synchronization between the mobile device and client device is accomplished without user intervention. Through provisional rendering of telephonic communication and data access functionality associated with a user's mobile device by the VMP host server, examples of the present invention thus enable virtual replication of the mobile device on an auxiliary or surrogate computing device.

Furthermore, while the invention has been described with respect to exemplary embodiments, one skilled in the art will recognize that numerous modifications are possible. For example, although exemplary embodiments depict a notebook computer as the surrogate computing device, the invention is not limited thereto. For example, the surrogate or auxiliary computing device may be a netbook, a tablet personal computer, a smartphone, or any other computing device have network access and configured to communicate with the virtual mobile phone host.

Not all components, features, structures, characteristics, described and illustrated herein need be included in a particular example or implementation. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some examples have been described in reference to particular implementations, other implementations are possible according to some examples. Additionally, the arrangement o order of elements or other features illustrated in the drawings or described herein need not be arranged in the particular way illustrated and described. Many other arrangements are possible according to some examples.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A method comprising:
   collecting, via a virtual host server, user phone data and phone interface information from a virtual mobile phone application of a mobile phone device;
   receiving, via an authentication and control module, an access request associated with the mobile phone device from a user via a client device;
   activating, via the virtual host server, a mobile phone emulator on a browser interface associated with the client device based on the access request and the phone interface information, wherein the activated mobile phone emulator is able to use the phone interface information to replicate an interface of an operating system as provided on the mobile phone device when the phone interface information was collected;
   determining, via the authentication and control module, an access level request from the user via the browser interface on the client device;
   disabling the mobile phone device based on a second access level request from the user; and
   activating the mobile phone emulator on the client device based on the second access level request.

2. The method of claim 1, further comprising:
   retrieving, via the virtual host server only phone data from the virtual host server based on a first access level request.

3. The method of claim 1, further comprising:
   receiving a deactivation request from the user; and
   transferring, via the virtual host server, virtual phone data from the client device to the mobile phone device upon receiving the deactivation request.

4. A system comprising:
   a virtual host server to communicate with a telecommunication service provider, a computing device, and a mobile phone device, wherein the virtual host server is to collect user phone data and phone interface information from a virtual mobile phone application; and
   an authentication and control module to control access to the computing device and the virtual host server,
   wherein the authentication and control module determines a user access level based on a phone access request from a user via a browser interface on a client device,
   wherein the mobile phone device is disabled and a mobile phone emulator is activated on the client device based on a second access level request from the user, and
   wherein the activated mobile phone emulator is able to replicate an interface of an operating system as provided on the mobile phone device when the phone interface information was collected.

5. The system of claim 4, wherein the virtual host server is to retrieve only phone data from the virtual host server based on a determined first access level request.

6. The system of claim 4, wherein the mobile phone emulator includes both a main window to emulate a primary display area of the mobile phone device and an adjacent auxiliary input window to emulate additional input functionality for the main window.

7. The system of claim 5, wherein upon receiving a deactivation request from the user, virtual phone data of the client device is automatically transferred via the virtual host server.

8. A method comprising:
   collecting, via a virtual host server, user phone data and phone interface information from a virtual mobile phone application of a mobile phone device;
   receiving, via an authentication and control module, an access request associated with the mobile phone device from a user via a client device;
   determining, via the authentication and control module, a phone access level based on the access request received from the user;
   retrieving, via the virtual host server, only phone data from the virtual host server based on a first access level request;
   disabling the mobile phone device and activating a mobile phone emulator on the client device based on a second access level request from the user,
   wherein the mobile phone emulator is associated with the phone interface information such that an operating system interface of the mobile phone device is replicated on the client device.

9. The method of claim 8, further comprising:
   receiving a deactivation request from the user; and
   transferring, via the virtual host server, virtual phone data from the client device to the mobile phone device upon receiving the deactivation request.

10. The method of claim 8, wherein the activated mobile phone emulator is associated with a browser interface associated with the client device.

11. The method of claim 8, wherein the mobile phone emulator includes a main window to emulate a primary display area of the mobile phone device and an adjacent auxiliary input window to emulate additional input functionality for the main window.

* * * * *